(12) United States Patent
Müller

(10) Patent No.: US 6,603,982 B1
(45) Date of Patent: Aug. 5, 2003

(54) METHOD OF OPERATING A COMMUNICATION DEVICE WITH SIM CARDS

(75) Inventor: Ulrich Müller, Ulm (DE)

(73) Assignee: Nokia Mobile Phones Ltd., Espoo (FI)

( * ) Notice: Subject to any disclaimer, the term of this patent is extended or adjusted under 35 U.S.C. 154(b) by 449 days.

(21) Appl. No.: 09/584,430

(22) Filed: May 31, 2000

(30) Foreign Application Priority Data

Jun. 1, 1999 (DE) .......................................... 199 25 254

(51) Int. Cl.[7] .............................. H04B 1/38; H04M 3/42
(52) U.S. Cl. ...................................... 455/558; 455/414
(58) Field of Search ................................ 455/558, 550, 455/551, 552, 553, 418, 419, 420, 414, 456, 424, 425, 407, 557

(56) References Cited

U.S. PATENT DOCUMENTS

| | | | | |
|---|---|---|---|---|
| 5,259,018 A | * | 11/1993 | Grimmett et al. ............ | 455/558 |
| 5,875,404 A | * | 2/1999 | Messiet ........................ | 455/558 |
| 5,887,266 A | * | 3/1999 | Heinonen et al. ............ | 455/558 |
| 5,915,226 A | * | 6/1999 | Martineau .................... | 455/558 |
| 6,012,634 A | * | 1/2000 | Brogan et al. ............... | 235/380 |
| 6,205,327 B1 | * | 3/2001 | Sentinelli ..................... | 455/407 |
| 6,311,241 B1 | * | 10/2001 | Hofmann ..................... | 710/102 |

FOREIGN PATENT DOCUMENTS

| | | |
|---|---|---|
| DE | 19742796 | 4/1999 |
| EP | 0586081 | 3/1994 |
| EP | 0762715 | 3/1997 |
| EP | 0556970 | 9/1997 |
| EP | 0586081 | 4/1998 |
| GB | 2345177 | 6/2000 |
| WO | 9219078 | 10/1992 |
| WO | 9408433 | 4/1994 |
| WO | 9428686 | 12/1994 |
| WO | 9512293 | 5/1995 |

OTHER PUBLICATIONS

Mohammed Zaid, "Personal Mobility in PCS" Personal Communications, IEEE Communications Society US, Bd. 1, Nr. 4, Oct. 12–16, 1994.

* cited by examiner

*Primary Examiner*—Dac Nguyen
(74) *Attorney, Agent, or Firm*—Ware, Fressola, Van Der Sluys & Adolphson

(57) ABSTRACT

The invention concerns a method of operating a communication device with a transceiver 12, where at least two SIM cards 15.1, 15.2 are provided and one of these SIM cards 15.1 is logged-in. As soon as one of the SIM cards 15.1 is logged-in, this manner of operating provides that the other SIM card 15.2 can only be logged-in when the other SIM card 15.1 is no longer active. For example if the SIM card 15.1 is the one used to establish a normal telephone connection, and the SIM card 15.2 is the one which is used to update a navigation system for example, no street index adaptation or traffic jam messages can be transmitted if the SIM card 15.1 is active, i.e. is logged into the network. To avoid the corresponding disadvantages, it is proposed that the logged-in SIM card 15.1 uses information from the remaining not logged-in SIM card(s) 15.2. This ensures that in order to use functions which are connected to the not logged-in SIM card(s) 15.2, the call number of the logged-in SIM card 15.1 is transmitted to the provider of this (these) SIM card(s) 15.2, so that he can use the call number of the logged-in SIM card 15.1 to ensure that his services are able to function.

1 Claim, 3 Drawing Sheets

METHOD OF OPERATING A COMMUNICATION DEVICE WITH SIM CARDS

TECHNICAL FIELD

The present invention is directed to the operation of a communication device having a transceiver and at least two SIM cards.

BACKGROUND OF THE INVENTION

It is known in the state of the art that to use GSM telephones a so-called SIM card which enables access to the corresponding networks is needed. In addition to other functions, each SIM card is also equipped with an EEPROM (Electrically Erasable Programmable Read-Only Memory) which contains all the useful, relevant and individual information. Such an EEPROM for example stores the so-called IMSI (International Mobile Subscriber Identification) the PIN (Personal Identification Number) and Super PIN, the international access entitlement, the priority class and the subscriber information.

If a subscriber wants to make a call and turns on his mobile telephone, he is first requested to enter his PIN. If the entered PIN coincides with the PIN stored on the SIM card, it is determined via the IMSI whether the subscriber is properly activated and which additional services he is entitled to use. The subscriber also identifies himself to the network with the MSISDN (Mobile Subscriber Integrated Services Digital Network) radio telephone number stored on the SIM card. By means of the so-called authentication the network then ensures that this is actually an authorized GSM subscriber and after a successful test logs him into the network. The authentication method is based on a comparison of computation results which are determined in parallel on the SIM card and in the network. The computation result is based on a suitable subscriber code which is stored on the SIM card. This individual code is also known to the network side. Both sides process the same input values. Subscriber authentication is provided when the results coincide. Each authentication leads to a new computation which uses a new input value to prevent wrong charges due to manipulation. The calls can only be switched to the "right" receiver since the authentication method is used here as well.

In addition to this generally known application, it is also known to equip transceivers with several SIM cards. Such a method is described in greater detail for example in the GB 2345177 application of Nov. 26, 1998. The reason and purpose of using several SIM cards is that if an activated SIM card (logged into the network) is lost, the telephone operation can continue with another SIM card.

One of the principal areas of these applications is the automobile. There the car telephone is almost a series production. So-called navigation systems are also entering the market, which by means of corresponding illustrations inform the driver of the route to his target. Since at present such navigation systems leave much to be desired, devices which take actual changes (such as for example construction sites or traffic jams) into consideration have lately been announced. In that case the corresponding changes are transmitted by a transceiver. This transceiver can also be used to transmit the vehicle's location, for example of an automobile that was damaged during an accident or was stolen. However, the use of these functions presupposes that the car telephone is logged into the network. But this is not necessarily required. For example a user can change a (car) telephone which is not permanently installed in the car into a mobile telephone by removing it from the holder in the car and using it in his office for example. However if the telephone is permanently built into the car and the user wishes to also receive calls outside of his vehicle with the same car telephone number, there is the possibility of using the car telephone's SIM card in the normal mobile radio telephone. If a user operates in one or the other manner, updating the navigation system and transmitting vehicle data is only possible when the user inserts the SIM card back into the permanently installed car telephone or inserts the car telephone which he is using as a mobile radio telephone back into the car holder, so that it can communicate again with the navigation installation. But if the user does not insert the SIM card into a permanently installed car telephone, one solution proposes an automatic log-in via another SIM card, for example one that is permanently installed in the navigation unit. This method ensures that certain services remain available via the permanently installed (auxiliary) SIM card, even with a not inserted or logged-in (principal) SIM card. This is particularly advantageous if a logged-in (principal) SIM card is ejected from the holder during an accident, because then an emergency operation is still possible via the less vulnerable, permanently installed (auxiliary) SIM card.

But even this manner of operating is not entirely without problems. Because of the availability of only one transceiver, an alternating operation between a (principal) SIM card and an (auxiliary) SIM card for example can only use the (principal) SIM card or the (auxiliary) SIM card for the data exchange. Thus it is not possible to perform an update of the navigation system with an active (principal) SIM card for example. Nor is the car able to transmit any location data in that case. This can be used by car thieves for example, since the car's location cannot be determined when any (principal) SIM card is used and the (auxiliary) SIM card is then blocked, although the car can be tracked in principle by means of its components.

The objective of the invention is therefore to present a method whereby the services which are connected to another presently not active SIM card remain available in spite of an active SIM card.

SUMMARY OF THE INVENTION

Presentation of the Invention

This objective is achieved by a method of operating a communication device with a transceiver and with at least two SIM cards, where only one of these SIM cards is logged into the network, characterized in that the SIM card which is logged-in, reads and/or uses information from the remaining not logged-in SIM card(s). An advantageous further development of the invention is such a method where in order to use functions which are linked to the not logged-in SIM card(s), the call number of the respectively logged-in SIM card is transmitted to the provider of the not logged-in SIM cards, and the provider uses the call number of the respectively logged-in SIM card to ensure that his services are able to function.

If, as set forth above, a SIM card which is logged into the network can access or use information from the other not logged-in SIM card(s), the services which are accessible via the not logged-in SIM card(s) remain available and certain data, which for example can otherwise be used via the not logged-in SIM card, are transmitted to the logged-in SIM card for processing.

It is also possible to inquire about conditions or update through a provider of a not logged-in SIM card, if set forth above call number of the logged-in SIM card is transmitted to the provider of the not logged-in SIM card. In that case the provider can use the call number of the logged-in SIM card to ensure the function of his service without any problems.

BRIEF DESCRIPTION OF THE DRAWINGS

In which:

Figure 1:
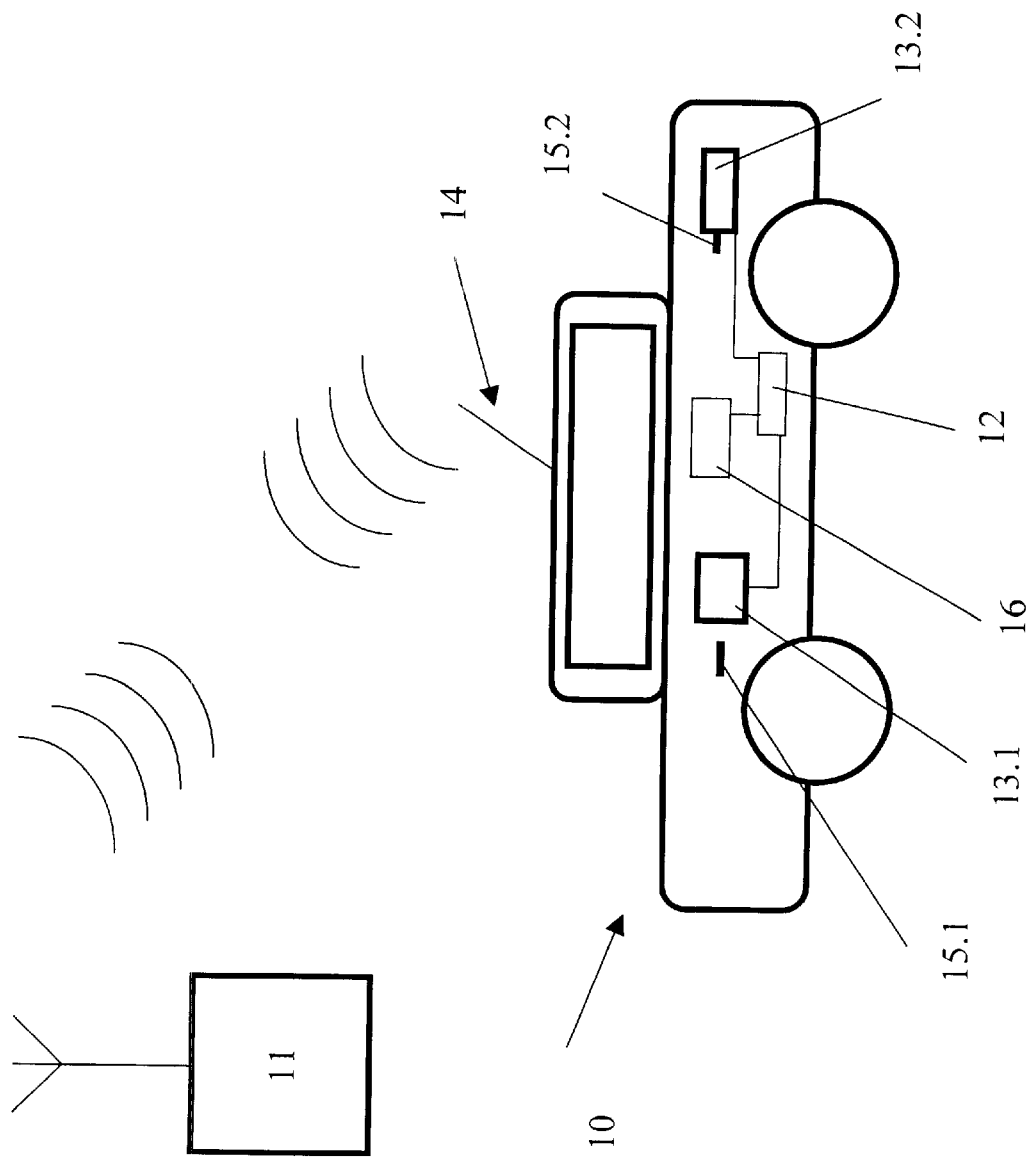
Figure 2:
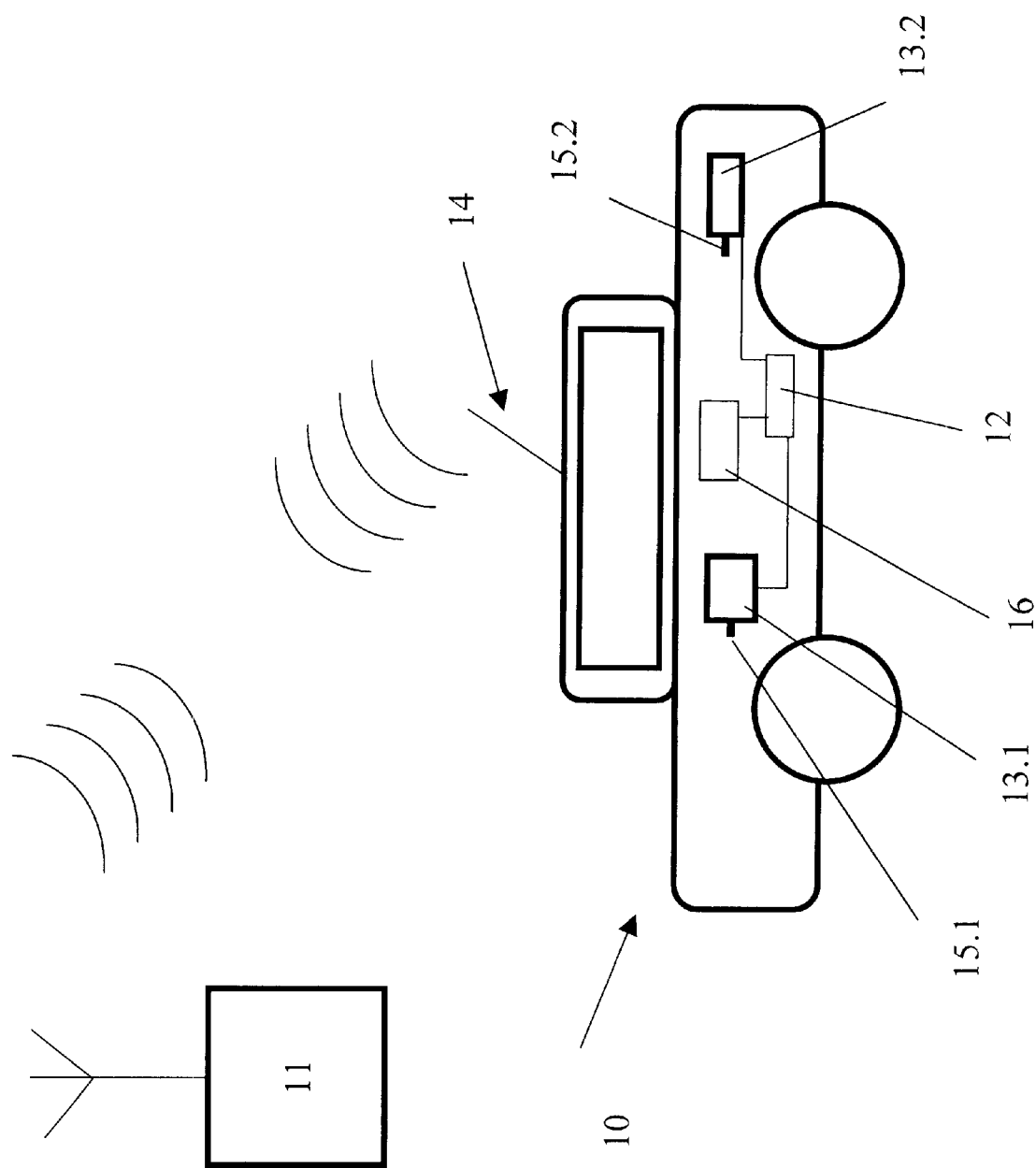
Figure 3:
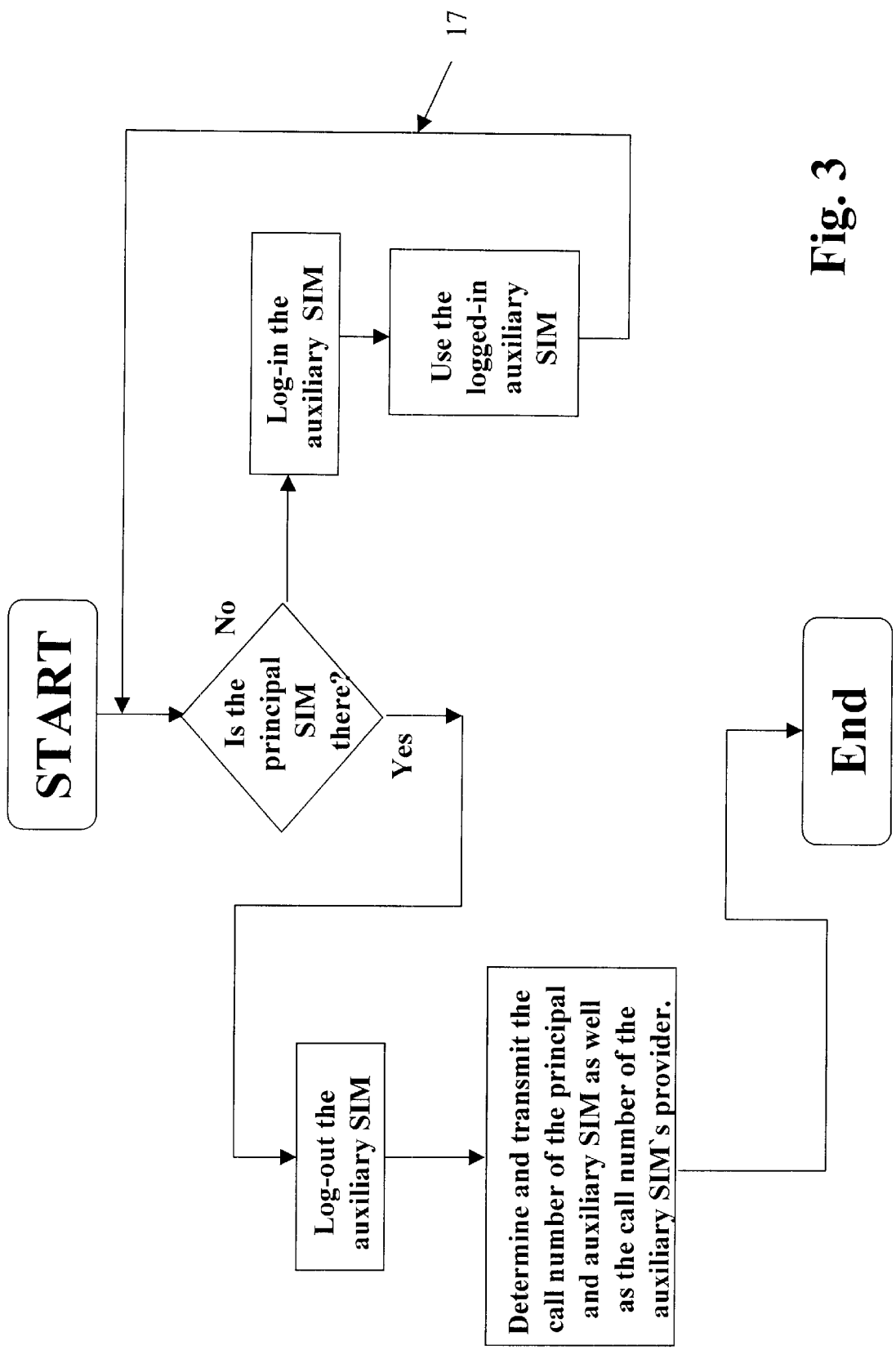

| | |
|---|---|
| FIG. 1 | is a (schematic) automobile with two SIM ports; |
| FIG. 2 | is another illustration of FIG. 1, and |
| FIG. 3 | is a flow diagram. |

BEST MODE FOR CARRYING OUT THE INVENTION

The invention will now be explained in greater detail by means of the figures. The automobile 10 shown in FIG. 1 is equipped with a transceiver 12, two SIM ports 13.1, 13.2 and an antenna 14 for communication with a remote station 11. The transceiver 12 is connected to the antenna 14 (not illustrated).

A SIM card 15.2 is inserted into the SIM port 13.2. This SIM card 15.2 is used to establish a connection between a provider, which for example is responsible for updating a navigation system 16 that is built into the automobile 10, and the transceiver 12 in the automobile 10 which is connected to the navigation system 16. It is not important for the operation of the invention whether this SIM card 15.2 is exchangeable or is hard wired into the SIM port 13.2. But since in this case the SIM card 15.2 is used to update the navigation system 16, it is hard wired into the SIM port 13.2 for reasons of constant availability.

No SIM card 15.1 is inserted into the SIM port 13.1 which in this case is located in the handset of a car telephone installed in the automobile 10 (not illustrated). This is indicated by a space between the SIM card 15.1 and the SIM port 13.1.

The respective state of occupancy of the different SIM ports 13.1, 13.2 is monitored by means of a routine. Such a routine is shown in greater detail in the flow diagram of FIG. 3. For example this routine always begins when the automobile 10 is started. A first step checks whether the principal SIM card, which is designated SIM card 15.1 in FIGS. 1 and 2, is inserted into the SIM port 13.1 and logged into the network. If this is not the case as illustrated in FIG. 1 the auxiliary SIM card, which is also designated SIM card 15.2 in connection with FIGS. 1 and 2, is immediately logged into the network. In each case this ensures that a connection exists to the provider whereby for example updates can be received at any time or emergency messages and location data can be transmitted.

The sequence can also be modified so that the auxiliary SIM card (5.2) is always logged-in as long as no principal SIM card (15.1) is active.

The line 17 indicates that the described routine runs again at predetermined intervals. In another not further illustrated embodiment, the routine can also be activated by an external event, perhaps an accident of the automobile 10. Since in contrast to the more or less permanent connection of the auxiliary SIM card (15.2) with the automobile 10, the principal SIM card (15.1) has fewer functional possibilities because it can easily drop out of the SIM port 13.1 during an accident, it is essential for the communication with the automobile 10 and the rapid introduction of rescue measures not to rely only on the periodical run of the routine, but to immediately begin a routine run in these cases.

The illustration in FIG. 2 differs from the one in FIG. 1 only in that the SIM card 15.1 is inserted into the SIM port 13.1 and logged into the network, and the SIM card 15.2 in the SIM port 13.2 is no longer logged into the network. Because there is only one transceiver 12, this situation ensures that the user can receive and make telephone calls at any time via the principal SIM card 15.1.

If the routine in FIG. 2 detects that a principal SIM card (15.1) exists and is logged into the network, an auxiliary SIM card (15.2) that is logged into the network is first logged-out. The logging-out of the auxiliary SIM card (15.2) is of course omitted if the latter had not even been logged-in, for example during the start of the automobile. In order to also use the services offered by the provider of the auxiliary SIM card (15.2) while the principal SIM card (15.1) is active, the call number, which is stored on the principal SIM card (15.1) and whereby contact with the automobile 10 can be established, is determined and transmitted to the provider of the auxiliary SIM card (15.2) by using the principal SIM card (15.1). In detail this takes place in that upon determining an active principal SIM card (15.1), the call numbers which are stored on the auxiliary SIM card (15.2) and whereby the connection from the automobile 10 to the provider and vice versa is established, are first determined. A connection is then established with the provider by using the principal SIM card (15.1) and the determined provider call number, and the provider is informed of the call numbers of the auxiliary SIM card (15.2) and the principal SIM card (15.1). Using this information the provider may be able to perform an update of the navigation system 16, because with the call number of the principal SIM card (15.1) which is now known to the provider, the latter can use it for a targeted updating.

When using the principal SIM card (15.1) it is also possible to transmit data in the same manner as receiving data. For example if the automobile 10 is equipped with a GPS (Global Positioning System) unit (not shown) and with an active auxiliary SIM card (15.2), the respective location data are transmitted to the provider via this card connection, and since the call number to the provider was determined with a non-active auxiliary SIM card (15.2), the principal SIM card (15.1) can use this number to establish a call or transmit data from the provider to the automobile 10.

What is claimed is:

1. A method of operating a communication device with a transceiver (12) and with at least two SIM cards (15.1, 15.2), where only one of these SIM cards (15.1) is logged into the network, characterized in that the SIM card (15.1) which is logged-in, reads and/or uses information from the remaining not logged-in SIM card or cards (15.2);

the method being further characterized in that:
   in order to use functions which are linked to the not logged-in SIM card or cards (15.2), the call number of the respectively logged-in SIM card (15.1) is transmitted to the provider of the not logged-in SIM card or cards (15.2),
   and the provider uses the call number of the respectively logged-in SIM card (15.1) to ensure that his services are able to function.

* * * * *

UNITED STATES PATENT AND TRADEMARK OFFICE
CERTIFICATE OF CORRECTION

PATENT NO. : 6,603,982 B1
DATED : August 5, 2003
INVENTOR(S) : Müller

It is certified that error appears in the above-identified patent and that said Letters Patent is hereby corrected as shown below:

Column 2,
Line 45, "Presentation of the Invention" should be deleted.

Column 3,
Line 1, before "call" -- the -- should be inserted.

Signed and Sealed this

Second Day of December, 2003

JAMES E. ROGAN
*Director of the United States Patent and Trademark Office*